Figure 4:
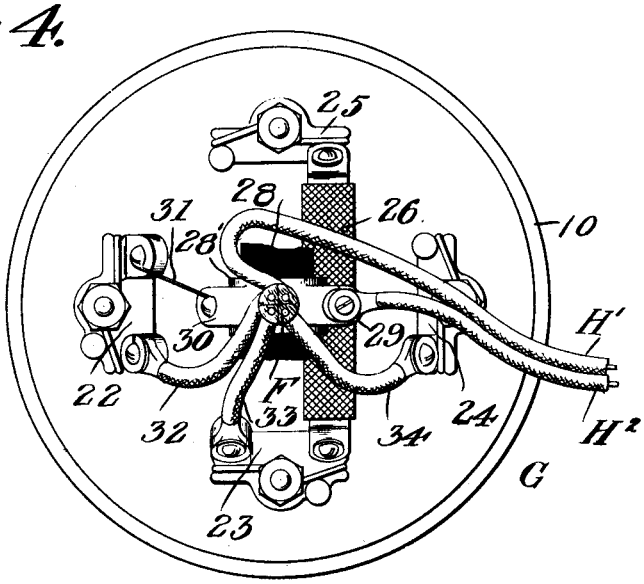

A. PALMROS.
ELECTRICALLY DRIVEN PORTABLE MACHINE.
APPLICATION FILED APR. 30, 1910.
1,066,648.
Patented July 8, 1913.
6 SHEETS—SHEET 1.
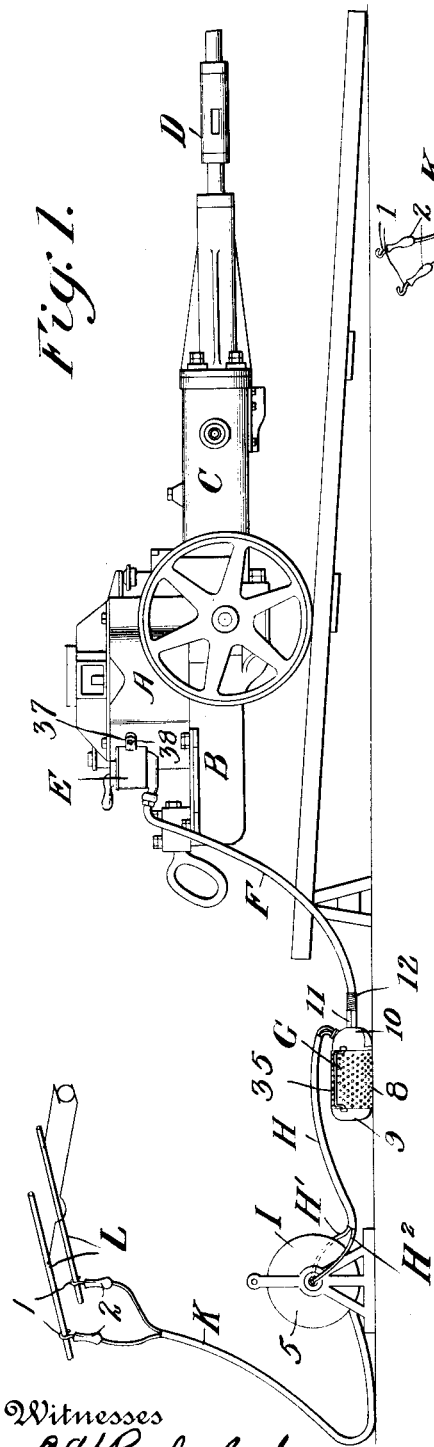
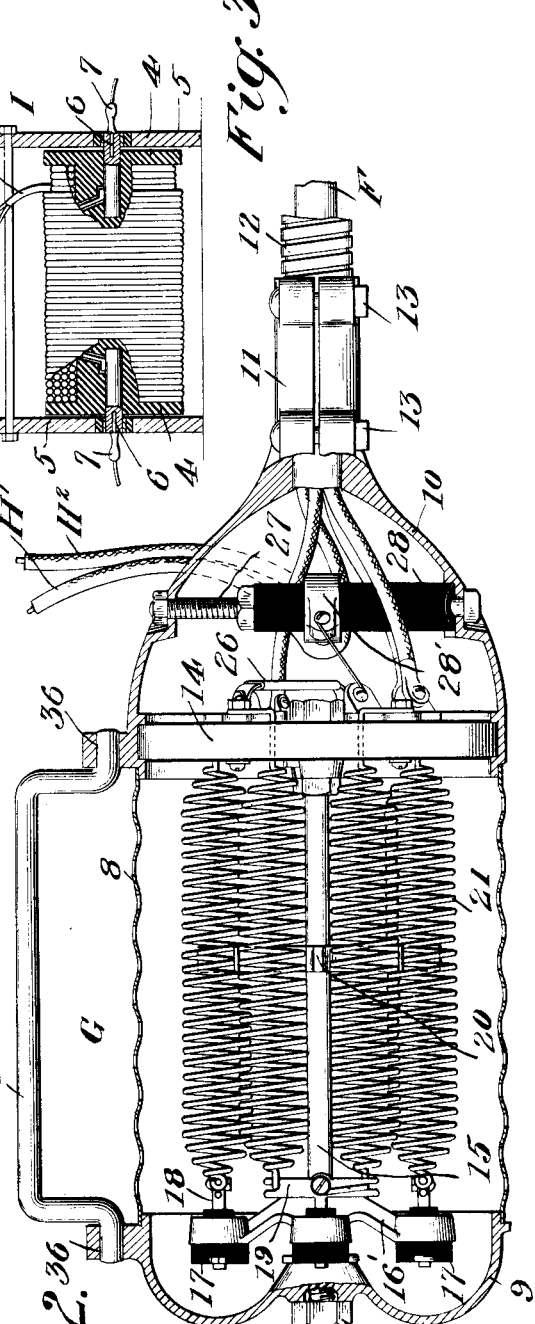
Witnesses
C. H. Reichenbach
J. M. Wynkoop
Inventor
Alexander Palmros
By Knight Bros
Attorneys A. PALMROS.
ELECTRICALLY DRIVEN PORTABLE MACHINE.
APPLICATION FILED APR. 30, 1910.

1,066,648.

Patented July 8, 1913.
6 SHEETS—SHEET 2.

Witnesses
C. H. Reichenbach.
J. M. Wynkoop.

Inventor,
Alexander Palmros
By Knight Bros
Attorneys.

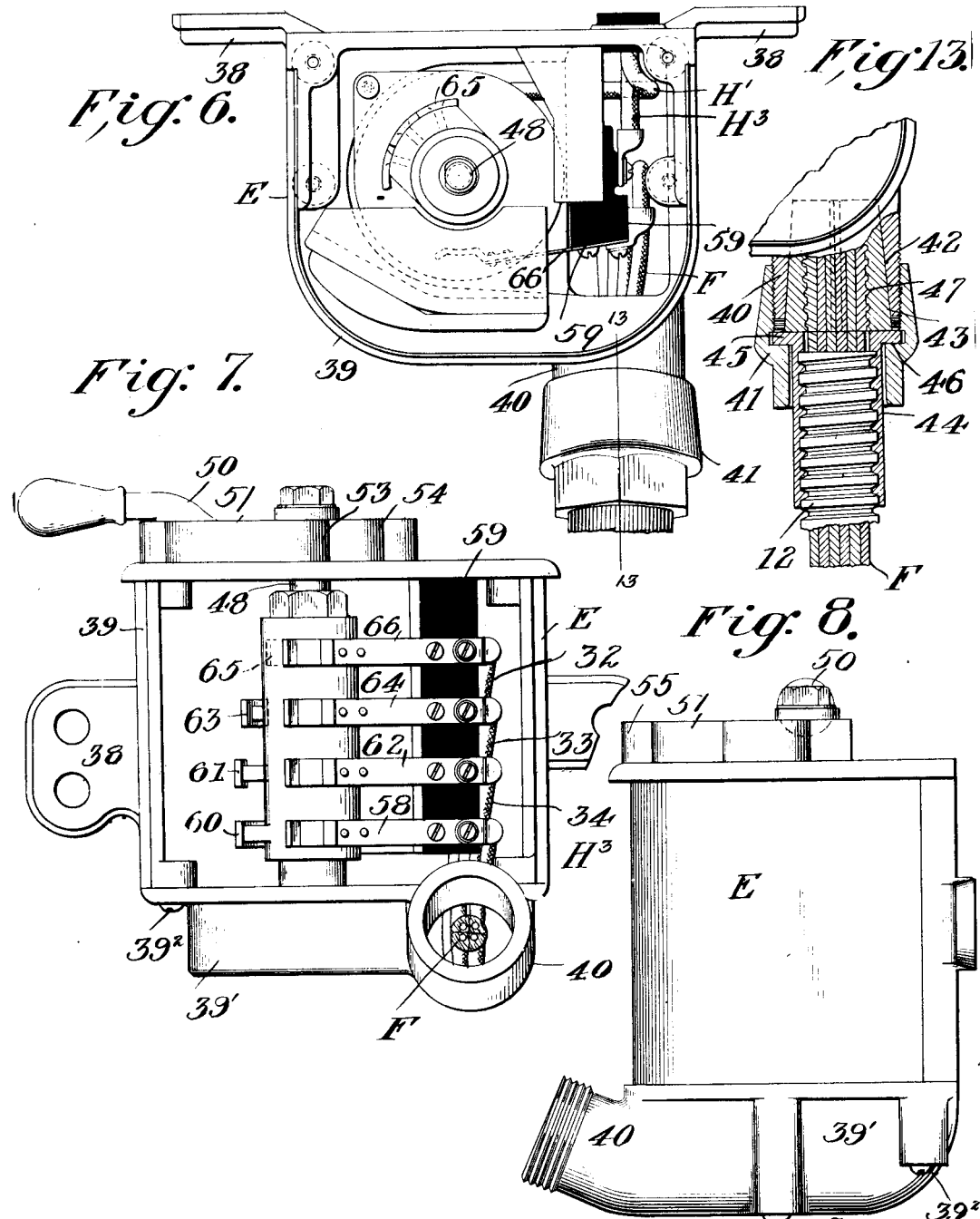

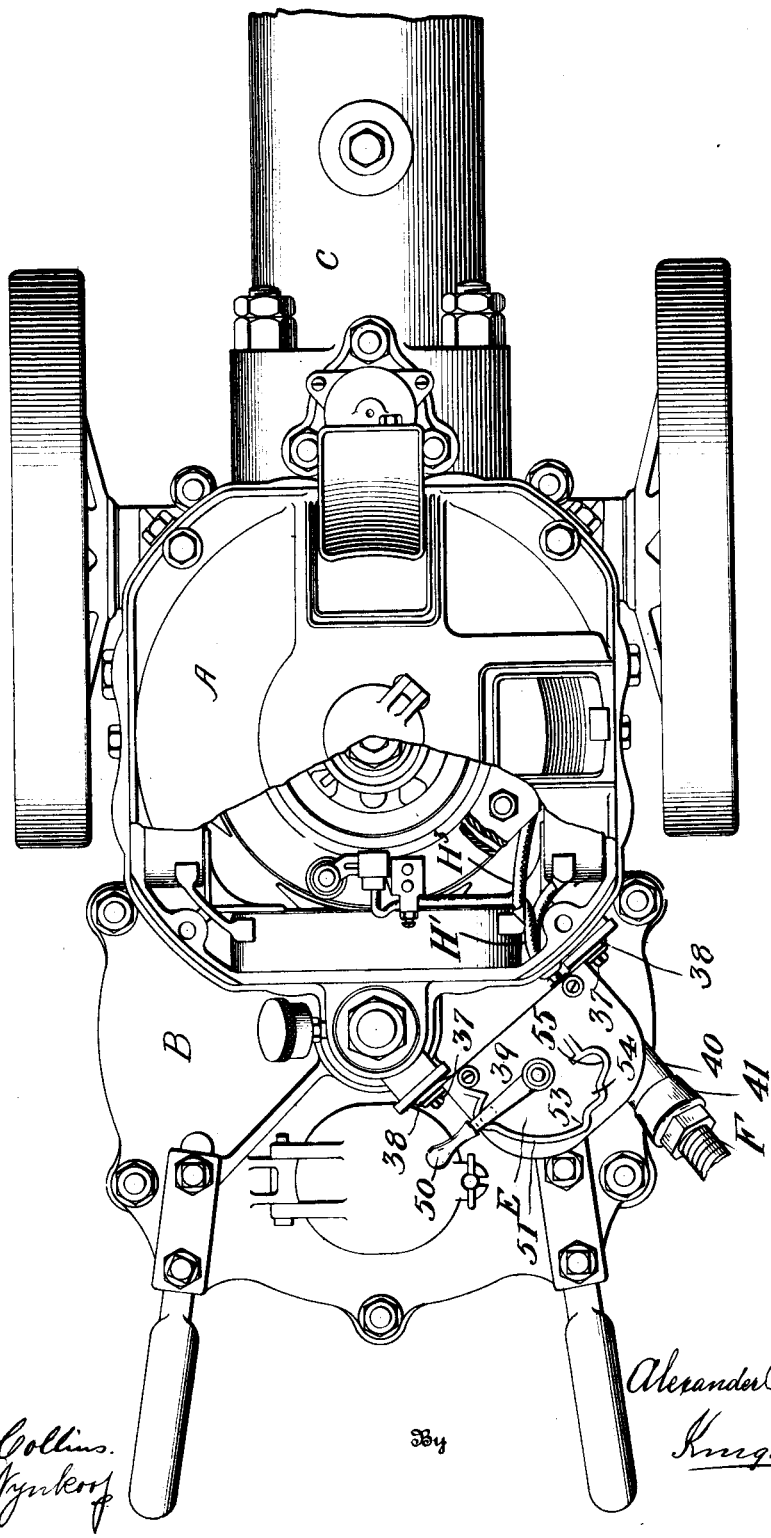

A. PALMROS.
ELECTRICALLY DRIVEN PORTABLE MACHINE.
APPLICATION FILED APR. 30, 1910.
1,066,648.
Patented July 8, 1913.
6 SHEETS—SHEET 5.
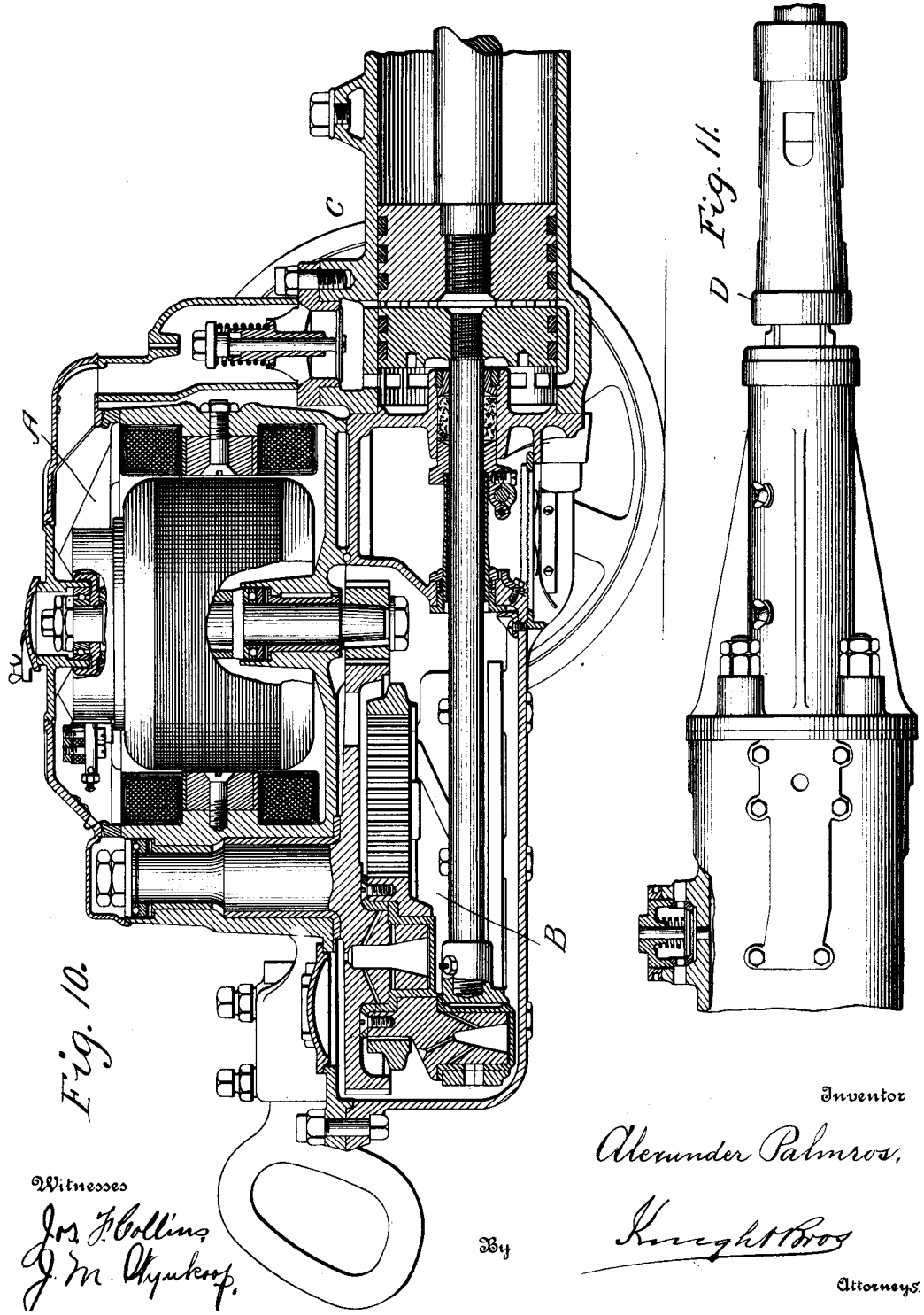

A. PALMROS.
ELECTRICALLY DRIVEN PORTABLE MACHINE.
APPLICATION FILED APR. 30, 1910.
1,066,648.
Patented July 8, 1913.
6 SHEETS—SHEET 6.
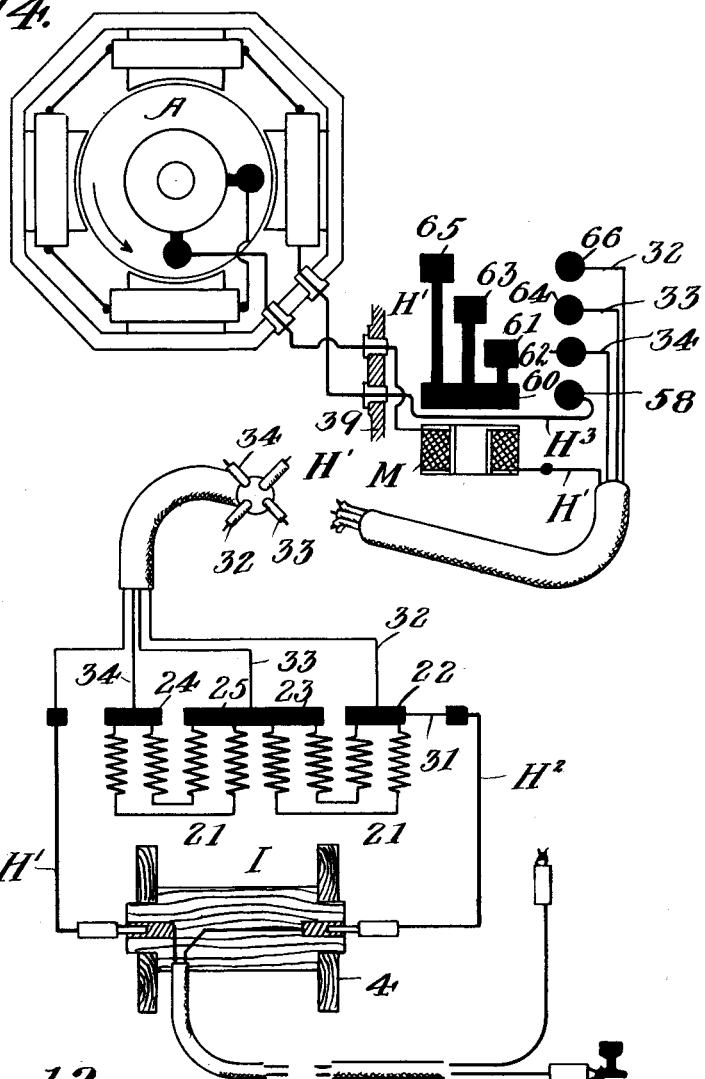
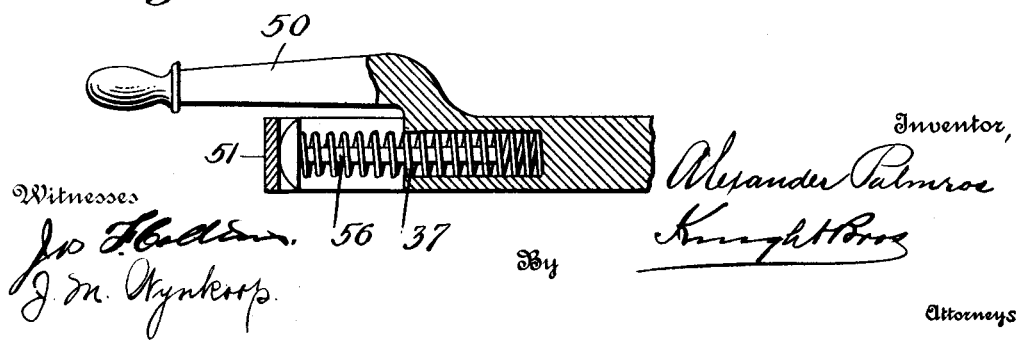

UNITED STATES PATENT OFFICE.

ALEXANDER PALMROS, OF SYRACUSE, NEW YORK, ASSIGNOR TO THE PNEUMELECTRIC MACHINE COMPANY, OF SYRACUSE, NEW YORK, A CORPORATION OF NEW YORK.

ELECTRICALLY-DRIVEN PORTABLE MACHINE.

1,066,648.  Specification of Letters Patent.  Patented July 8, 1913.

Application filed April 30, 1910. Serial No. 558,629.

*To all whom it may concern:*

Be it known that I, ALEXANDER PALMROS, a citizen of Finland, and resident of Syracuse, in the county of Onondaga and State of New York, have invented certain new and useful Improvements in Electrically-Driven Portable Machines, of which the following is a specification.

My invention relates to means for electrically operating portable machines, and more especially to that class of portable machines which, while having their working parts actuated by an electric motor, are manipulated or directed to their work more or less by hand; and also to machines used for purposes which render it necessary to shift the machine frequently to change the point at which its work is performed. In all machines operated under circumstances similar to these, it is desirable to have as little complication as possible, upon the machine, and to reduce the weight of the machine as much as practicable; yet such machines require all the elements of control and facilities which render control convenient, prompt and effective, just as much as machines of larger type, wherein complication and weight of the contained parts are not so objectionable.

It is also an object of my invention to facilitate the use of electrically driven portable machines in conducting industries where electric current supply equipment is already present, as for instance in connection with conveying facilities as in mining, quarrying, or such like places, or for lighting and other power purposes as in large structural works, fixed manufacturing plants, and the like.

In carrying out my invention, I remove from the machine to be operated, all those portions of the current supplying and controlling means comprising leads of the circuit, the means for coiling or storing the leads or that portion thereof not called into use, and the rheostat or current producing means, and I simply provide the machine, with a suitable selector or controller, in addition to the motor, by which to determine which current is to be utilized in the operation of the motor, a plurality of wires, in addition to a return wire being led from the controller to the rheostat and there connected respectively with the different resistance terminals; and I provide each of the elements of supply and control with convenient attaching and detaching connectors respectively suited to the particular device with which they are connected in use.

For purposes of illustration, I have shown my invention in the accompanying drawings, embodied in an electro-pneumatic coal mining machine of the "puncher type."

Figure 5:
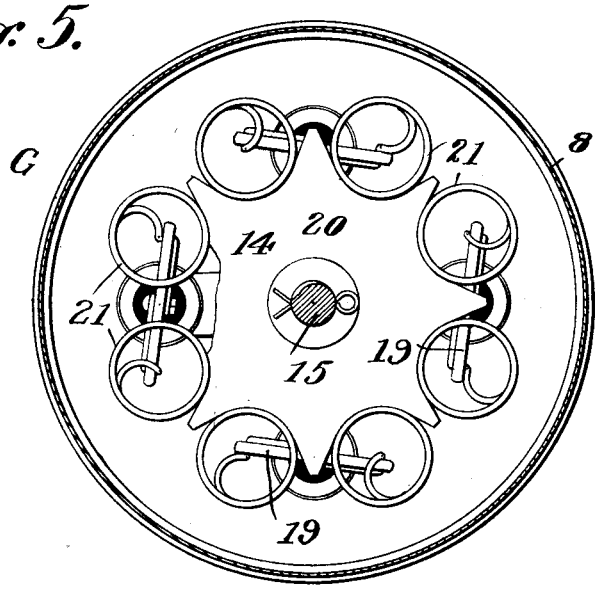

In said drawings, Figure 1 is a view showing the machine to be operated, a cable leading therefrom to the rheostat, a rheostat with its feed wires leading to the means which stores the lead wires, and the lead wires with their storage means and their means for convenient attachment to a pair of conductors, such as trolley or other line wires; Fig. 2 is a view of the rheostat and its feed and distributing wires, the casing of the rheostat being shown in section; Fig. 3 is a sectional view of the reel or lead wire storage means, having the rheostat feed wires in position thereon to receive current; Fig. 4 is an end view of portions of the rheostat, illustrating the connection of the distributing wires thereto; Fig. 5 is a transverse section through the rheostat; Fig. 6 is a plan and Figs. 7 and 8 are respectively front and side elevations of the controller which is mounted upon the machine; Figs. 9 and 10 are respectively a top view with a casing partly in section, and in vertical axial section with the front portion broken away of the selector-pneumatic machine; Fig. 11 is a bottom plan view of the front portion of the machine which is broken away; Fig. 12 is a sectional view of the controller handle; Fig. 13 is a sectional view on line 13—13 of Fig. 6, and, Fig. 14 is a diagrammatic view of the wiring.

Referring to Fig. 1, A represents the electric motor, B the gear casing for converting rotary electric into right line reciprocating movement, C the means for developing and utilizing air pressure, and D the tool carrying element of an electro-pneumatic machine, the purposes of which are of the character requiring the type of current supply and control already explained.

E represents the current selecting device or controller mounted upon the machine, while F is a cable containing a plurality of conductors of which one serves as a return wire, while the remainder serve as distributing wires through which current of different strength is brought within reach of the selector E which controls its supply to the motor on the machine.

G represents the rheostat or resistance box which is interposed in the external circuit of the motor in the manner indicated, at a point removed from the machine, and is constructed with a casing that adapts it to be laid around upon the ground without injury.

H represents the feed and return wires, one of which connects with a terminal at one end of the rheostat, while the other extends through the rheostat, and forms part of the cable F.

I represents the lead wire storage or coiling reel.

K represents the lead wires, and L are line wires which are to be understood as leading from a suitable source of electrical supply. The lead wire K is provided with hooks 1 and insulating handles 2 for convenient attachment to the line wires L or to a single line wire and a rail, if the track is used, as the return conductor; or to a third rail and a track rail as the case may be. The lead K is of such length as to permit the use of the machine to be operated off in a siding or inlet from the main entry of a mine or at any other point comparatively remote from the line wires, and in order to adapt it for convenient use, said lead is wound upon the reel I with its inner ends fixed in electrical contact with the trunnions 4 of the reel, so that any length of portion of the lead K may be unwound from the reel without impairing or requiring readjustment of conducting connections. The reel I is mounted in a supporting frame 5 which may be of any suitable or desired construction.

The feed H is provided with pin terminals 6 and insulating handles 7 to facilitate introducing the ends of said feed into sockets in the trunnions 4 to establish electrical connection with the members of the lead K.

The cable H is made up of two wires, one of which, indicated at H', passes into and through the housing 10 and on to the selector or controller hereinafter described, forming a part of the cable F. The other wire H² is secured to the arm 29 of sleeve 28' (see Fig. 4). The other arm 30 of the sleeve is connected by a fuse wire 31 with the contact plate 22. The distributing wires 32, 33, and 34 are connected to the contact plates 22, 23, and 24, as shown, and lead from said contact plates through the flexible sleeve 12, said wires forming a part of the cable F.

The out-turned ends of a bail 35 engage openings 36 formed in the housings 9 and 10, said bail serving as a handle to aid in the ready transportation of the resistance box G from one point to another.

For determining the strength of the current to be delivered to the motor A of the machine, the controller illustrated in Figs. 6, 7 and 8 is employed. This controller has been designated in a general way by the reference character E, and by referring to Fig. 9, it will be seen that this controller is secured to the frame of the machine by fastening devices such as bolts 37, said bolts passing through ears 38 of the housing or casing 39 of the controller E. This casing has a removable base portion 39' secured in position by screws 39². This portion 39' is provided with a neck extension 40, this neck extension being externally threaded for the reception of a nut 41. The bore of the neck extension 40 is tapered as at 42, and a split and tapered sleeve 43 lies within this bore. An internally threaded sleeve 44 is provided with a flange 45 against which a shoulder 46 of nut 41 abuts when said nut is threaded upon the neck extension 40. The internally threaded sleeve 44 receives the end of the flexible metallic sleeve 12. When the nut 41 is screwed upon the neck extension 40, it is apparent that the sleeve 44 will be forced inwardly. This sleeve in turn pressing against the outer end of the split and tapered sleeve 43, will cause this split sleeve to bind firmly upon the cable F. This split sleeve is internally grooved at 47 to render this binding action more efficient, and to more efficiently hold the cable F against endwise movement, whereby any strain upon the ends of the distributing wires, within the housing 39, is prevented.

A spindle 48 is mounted for partial rotation within the housing 39 and is actuated by the handle 50. A segment 51, located upon the top of the housing 39, has locking recesses 52, 53, 54 and 55 formed therein. The handle 50 carries a plunger 56 that is normally pressed, by a spring 37, into engagement with the inner face of the segment 51, it being apparent that this plunger will snap into any of the recesses 52, 53, 54, or 55, and will be held thereby in any of the corresponding positions.

The return wire H' that forms a part of the cable F is connected with the blow-out coil indicated at M in Fig. 14. This wire is continued from this blow-out coil to one of the poles of the motor A. Another conducting wire H³ leads from the other pole of the motor through the rear wall of the housing 39 and is connected to a contact arm 58 secured to an insulating block 59. This contact arm is adapted to contact when the spindle 48 is rotated, with a comparatively long segment 60. At the same time a shorter segment 61 contacts with a second contact arm 62, likewise secured to the insulating block 59. The contact of these two segments 60 and 61 with the arms 58 and 62 occurs when the handle 50 is moved to such position that the plunger 56 engages in the recess 53. Continued movement of the handle, to bring the plunger into engagement with the recess 54, moves the segment 61 out of contact with the arm 62 and brings a second short segment 63 into contact with an arm 64, while a still further movement of the handle to bring this plunger into engagement with the recess 55, moves the segment 63 out of engagement with the arm 64 and brings a segment 65 into engagement with a contact arm 66. The wire 32 is connected to the contact arm 66, the wire 33 is connected to the contact arm 64, and the wire 34 is connected to the contact arm 62. It will therefore be seen that when the handle 50 is moved to this first position or in such position as to bring the segments 60 and 61 into contact with the arms 58 and 62, to thereby bridge said arms, the circuit is completed through wire 34 to contact plate 24 in the resistance box, thence through all of the pairs of resistance coils which are connected in multiple as shown in Fig. 14, the contact plate 22, fuse wire 31, and feed wire $H^2$, to the arbor of the reel I.

A further movement of the handle, as has been above described, bridges and completes the circuit between arm 58 and arm 64, thus bringing the feed wire $H^3$ of the motor into electrical communication with the distributing wire 33 which leads, as is clearly shown in the diagrammatic view, to the contact plate 23, the circuit being completed through two of the pairs of resistance coils arranged in multiple to the contact plate 22, and through the fuse wire 31 to the feed wire $H^2$, this path offering less resistance to the current, and consequently causing more current to be supplied to the motor and thereby increasing the speed of said motor.

When it is desired to run the motor at full speed, all of the resistance coils are cut out by moving the handle 50 to such position as to bridge the contact arms 58 and 56, it being apparent that the circuit is then completed through wire 32, contact plate 22 and fuse wire 31 to the feed wire $H^2$.

By providing a plurality of resistance coils and connecting them in multiple, as shown, the necessary resistance is secured but without excessive heating. The perforated casing 8 of the resistance box permits a free circulation of air around the resistance coils, and the ready escape of the heat from said casing. Since the feed wire H is readily removable from the reel I, as hereinbefore set forth, this reel with the lead wire K wound thereon may be readily moved from one point to another independently of the machine and the resistance box G. It will therefore be seen that the cable carrying elements and the resistance elements are, by virtue of the structure herein shown and described, operatively located with relation to the machine and yet are not mounted upon said machine, the machine proper comprising only the absolutely essential elements necessary to its operation, whereby its weight is decreased and it may be easily and efficiently handled and moved, to present the cutting tool to the work in the most advantageous manner possible.

Referring to Figs. 9, 10 and 11, it will be seen that the machine embodies in its structure merely the prime mover A, the motion transmitting means B, the pressure developing and utilizing mechanism C, and the tool-carrying member D, in addition to the current selecting or controlling switch B already described. While any suitable electro-pneumatic machine may be employed in connection with my new system of current supply and control, I have illustrated that disclosed in previous applications filed by me, the novel points of which are not claimed in this application.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having thus described my invention, what I claim as new therein and desire to secure by Letters Patent, is:—

1. In a system for operating portable electrically driven machines, the combination of lead wires having means through which to connect them with fixed circuit connections, and of suitable length to conduct current therefrom to a remote place of operation, a winding reel upon which said conductors are wound, having terminals with which the inner ends of said conductors are in constant electrical connection, a rheostat electrically connected with the lead wires, a plurality of distributing wires connected with the distributing points on the rheostat, and a machine to be operated having an electric motor, and a controlling switch receiving the ends of the distributing wires.

2. In a system for operating portable electrically driven machines, the combination of lead wires having means through which to connect them with fixed circuit connections and of suitable length to conduct current therefrom to a remote place of operation, a winding reel upon which said conductors are wound having terminals with which the inner ends of said conductors are in constant electrical connection, short feed wires adapted to connect with the terminals on the winding reel, a rheostat connected with said short feed wires, a plurality of distributing wires connected with the distributing points on the rheostat, and a machine to be operated having an electric motor, and a controlling switch receiving the ends of the distributing wires.

3. In a system for operating portable electrically driven machines, the combination of lead wires having means through which to connect them with fixed circuit connections and of suitable length to conduct current therefrom to a remote place of operation, a winding reel upon which said conductors are wound, having terminals with which the inner ends of said conductors are in constant electrical connection, short feed wires adapted to connect with the terminals on the winding reel, a rheostat electrically connected with said short feed wires, a plurality of distributing wires connected with the distributing points on the rheostat, and a machine to be operated, having an electric motor and a controlling switch receiving the ends of the distributing wires; said rheostat being separable from the machine and from the winding reel.

The foregoing specification signed at Syracuse, N. Y. this 8th day of March, 1910.

ALEXANDER PALMROS.

In presence of two witnesses:
ELMER C. WARD,
M. F. WHELLEY.